US010882407B2

(12) United States Patent
Mancini et al.

(10) Patent No.: US 10,882,407 B2
(45) Date of Patent: Jan. 5, 2021

(54) LOW ENGINE SPEED ELECTRIC ACCESSORY LOAD REGULATION ON MOVING VEHICLES

(71) Applicant: BAE Systems Controls Inc., Endicott, NY (US)

(72) Inventors: Bart W. Mancini, Newark Valley, NY (US); Arthur P. Lyons, Maine, NY (US); Robert J. Vovos, Vestal, NY (US)

(73) Assignee: BAE Systems Controls Inc., Endicott, NY (US)

(*) Notice: Subject to any disclaimer, the term of this patent is extended or adjusted under 35 U.S.C. 154(b) by 285 days.

(21) Appl. No.: 16/014,080

(22) Filed: Jun. 21, 2018

(65) Prior Publication Data

US 2019/0389406 A1    Dec. 26, 2019

(51) Int. Cl.
*B60L 1/00* (2006.01)
*B60L 3/00* (2019.01)
*B60L 50/10* (2019.01)

(52) U.S. Cl.
CPC ........... *B60L 50/10* (2019.02); *B60L 2210/10* (2013.01); *B60L 2240/421* (2013.01); *B60L 2240/441* (2013.01); *B60L 2240/443* (2013.01)

(58) Field of Classification Search
CPC ............ B60R 16/033; B60L 2240/421; B60L 2240/441; B60L 2210/30; B60L 50/10; B60L 2210/10; B60L 2240/443
See application file for complete search history.

(56) References Cited

U.S. PATENT DOCUMENTS

| 7,057,376 | B2 | 6/2006 | Cook et al. | |
| 7,538,521 | B2 | 5/2009 | Berenger | |
| 9,018,878 | B2 | 4/2015 | Hendrickson et al. | |
| 2004/0148942 | A1 | 8/2004 | Pont et al. | |
| 2005/0151517 | A1* | 7/2005 | Cook | B60R 16/03 323/207 |
| 2007/0228735 | A1* | 10/2007 | Becker | H02P 9/30 290/40 C |
| 2018/0306159 | A1* | 10/2018 | Gotmalm | B61C 17/12 |
| 2020/0063400 | A1* | 2/2020 | Takigawa | B60W 10/06 |

OTHER PUBLICATIONS

International Search Report, PCT/US19/36513, dated Aug. 30, 2019, 9 pages.

* cited by examiner

*Primary Examiner* — Rexford N Barnie
*Assistant Examiner* — Rasem Mourad
(74) *Attorney, Agent, or Firm* — Scully Scott Murphy & Presser PC; Scott J. Asmus

(57) ABSTRACT

Systems and methods for reducing a likelihood that an engine exceeds its torque or power limit at a specific speed are provided. Also provided are systems and methods for reducing a likelihood that DC-DC converters and AC inverters overload a generator at a specific speed.

17 Claims, 10 Drawing Sheets

LOW ENGINE SPEED ELECTRIC ACCESSORY LOAD REGULATION ON MOVING VEHICLES

FIELD OF THE DISCLOSURE

This disclosure relates to accessory power systems for a vehicle. More particularly, this disclosure relates to systems and methods for regulating power to DC and AC accessories where power is supplied by a gen set.

BACKGROUND

Vehicles including conventional buses have accessories and accessory sub-systems that require power. The accessories may be DC accessories or AC accessories. These accessories may be powered using a low voltage battery. Additionally, the accessories may be powered using a gen set. The phrase gen set used herein refers to an engine mechanically coupled to a generator to provide alternating current (AC) electrical power output from the generator.

However, several events, including sudden drops in engine speed, the step application of additional accessory loads or the line starting of accessory motors may cause transient overloading of the generator and/or engine power limits.

In particular, when the engine speed is low, an accessory power system may be limited in available power either because of the engine or generator. For example, when accessories are switched into the power lines (buses), inrush power can transiently exceed the steady state power. Particularly challenging are the line starts of induction machines which can draw 5-10× nominal power for several 60 Hz cycles. It is also possible that steady state accessory loading may exceed the capability of the generator and or engine.

SUMMARY

Accordingly, disclosed is an accessory power system. The system comprises a first inverter coupled to a generator, a DC-DC converter, a second inverter and a processor. The generator is mechanically coupleable to an engine. The first inverter, when the generator is coupled to the engine, is configured to receive AC power from the generator and provide DC power for a first DC link.

The DC-DC converter is coupled to the first DC link and configured to receive the DC power from the first inverter and provide DC power to a second DC link to power a DC accessory. The second DC link is couplable to a battery.

The second inverter is coupled to the first DC link and configured to receive the DC power from the first inverter and provide AC power to an AC accessory.

The processor is configured to control the generator output and cause power to be supplied from the generator to the DC accessory and the AC accessory, compare a detected DC voltage on the first DC link with a DC voltage setpoint for the DC accessory. When the detected DC voltage is less than the DC voltage setpoint, the processor is configured to decrease an output current limit for the DC-DC converter from a baseline value. When the second DC link is coupled to the battery, power to the DC accessory is provided by the battery.

The system may supply power to one or more DC accessories and one or more AC accessories. When powering more than one DC accessory, the system may comprise a plurality of DC-DC converters. Each of the DC-DC converters is coupled to the first DC line and receives the DC power from the first inverter and provides DC power to the second DC link to respectively power a DC accessory.

Each DC accessory has a DC voltage setpoint. In an aspect of the disclosure, the same setpoint is used for all DC accessories. When the detected DC voltage on the first DC link is less than the DC voltage setpoint, the processor is configured to decrease the output current limit for each of the DC-DC converters. The power is supplied to each of the DC accessories by the battery. When the DC voltage on the first DC link returns to above the DC voltage setpoint, the processor is configured to increase the output current limit for the DC-DC power to the baseline value.

In an aspect of the disclosure, a different setpoint is used for the AC accessories than the DC accessories. For example, the setpoint for an AC accessory is less than the DC voltage setpoint. The processor is further configured to compare the detected DC voltage on the first DC link with the setpoint for the AC accessory. When the detected DC voltage is less than the setpoint for the AC accessory, the processor is configured to decrease a Volts-per hertz output of the second inverter from a baseline value.

Similarly, when the DC voltage on the first DC link returns to above the setpoint, the processor is configured to increase the Volts-per hertz output for the second inverter to the baseline value.

When powering more than one AC accessory, each AC accessory may have its own setpoint. The setpoint is set based on a priority for the accessory. In an aspect of the disclosure, each AC accessory may have its own second inverter. In another aspect of the disclosure, the same second inverter may be used for multiple AC accessories.

The different setpoint allows for a selective foldback of AC accessories. For example, when the detected DC voltage is less than a setpoint for one or more of the AC accessories, the processor is configured to decrease a Volts-per hertz output of one or more second inverters corresponding to the one or more AC accessories having the setpoint being greater than the detected DC voltage.

The processor is further configured to receive a detected speed of the generator or engine and compare the detected speed with a threshold. When the detected speed is less than the threshold, the processor is configured to lower a torque or power limit for the generator and control the generator based on the lowered torque or power limit. The torque or power limit is subsequently raised back to a baseline value when the detected speed moves to a speed at or higher than the threshold after being less than the threshold.

The processor is further configured to determine a length of time where a torque is greater than a threshold for a given speed. When the determined length of time is greater than a time threshold, the processor is configured to issue a torque or speed command to an engine controller to increase the speed of the engine to a specified speed.

The processor is configured to issue an instruction to a vehicle to remove an accessory from a load on the accessory power system when the torque still is greater than a threshold for the new speed.

Also disclosed is an accessory power system comprising a first inverter coupled to a generator, a DC-DC converter, a second inverter and a processor. The generator is mechanically coupleable to an engine. When the generator is coupled to the engine, the inverter is configured to receive AC power from the generator and provide DC power for a first DC link.

The DC-DC converter is coupled to the first DC link and configured to receive the DC power from the first inverter and provide DC power to a second DC link to power a DC accessory. The second DC link is coupleable to battery.

The second inverter is coupled to the first DC link and configured to receive the DC power from the first inverter and provide AC power to an AC accessory.

The processor configured to control the generator output and cause power to be supplied from the generator to the DC accessory and the AC accessory, receive a detected speed of the generator or engine and compare the detected speed with a threshold. When the detected speed is less than the threshold, the processor is configured to lower a torque or power limit for the generator and control the generator output based on the lowered torque or power limit.

DETAILED DESCRIPTION

The systems described herein may be used in any conventional moving vehicle such as a bus, car, truck, ship, tugboat, airplane and the like. The system does not require the use of a high voltage energy storage device. High used herein means a voltage above 50V.

Figure 1:
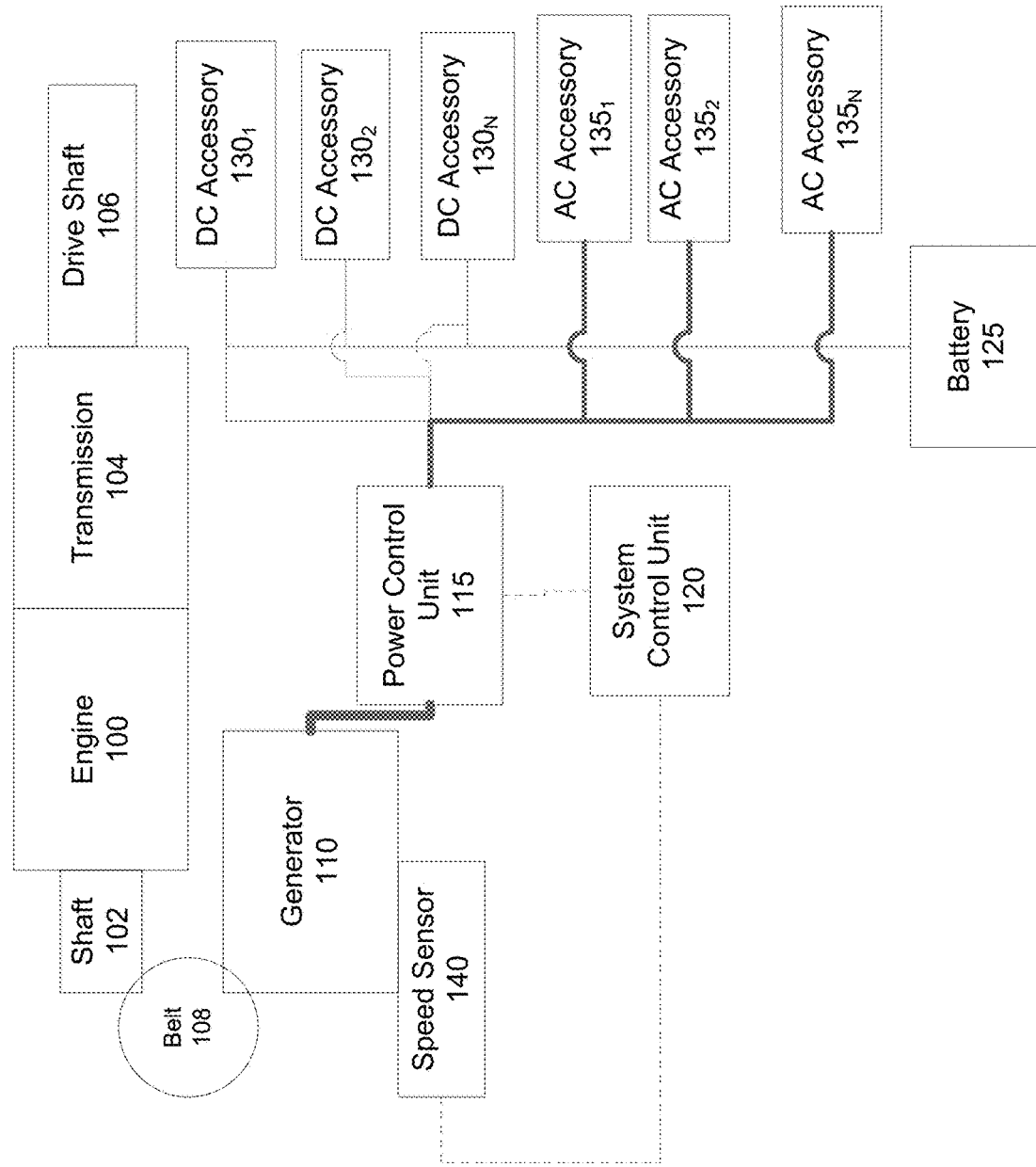
FIG. 1 illustrates a block diagram of an accessory power system coupled to an engine and a plurality of DC accessories and AC accessories in accordance with aspects of the disclosure where the generator is coupled via a belt to a shaft of the engine.

FIG. 1 illustrates a block diagram of an accessory power system coupled to an engine 100 and a plurality of DC accessories (collectively and generally referenced herein as 130) and AC accessories (collectively and generally referenced herein as 135) in accordance with aspects of the disclosure.

The engine 100 (e.g., a prime mover) may be an engine that uses gasoline, a diesel engine or a compressed natural gas (CNG) engine. The accessory power system is separate from the drivetrain. The drivetrain comprises the engine 100, the transmission 104 and drive shaft 106.

Figure 2:
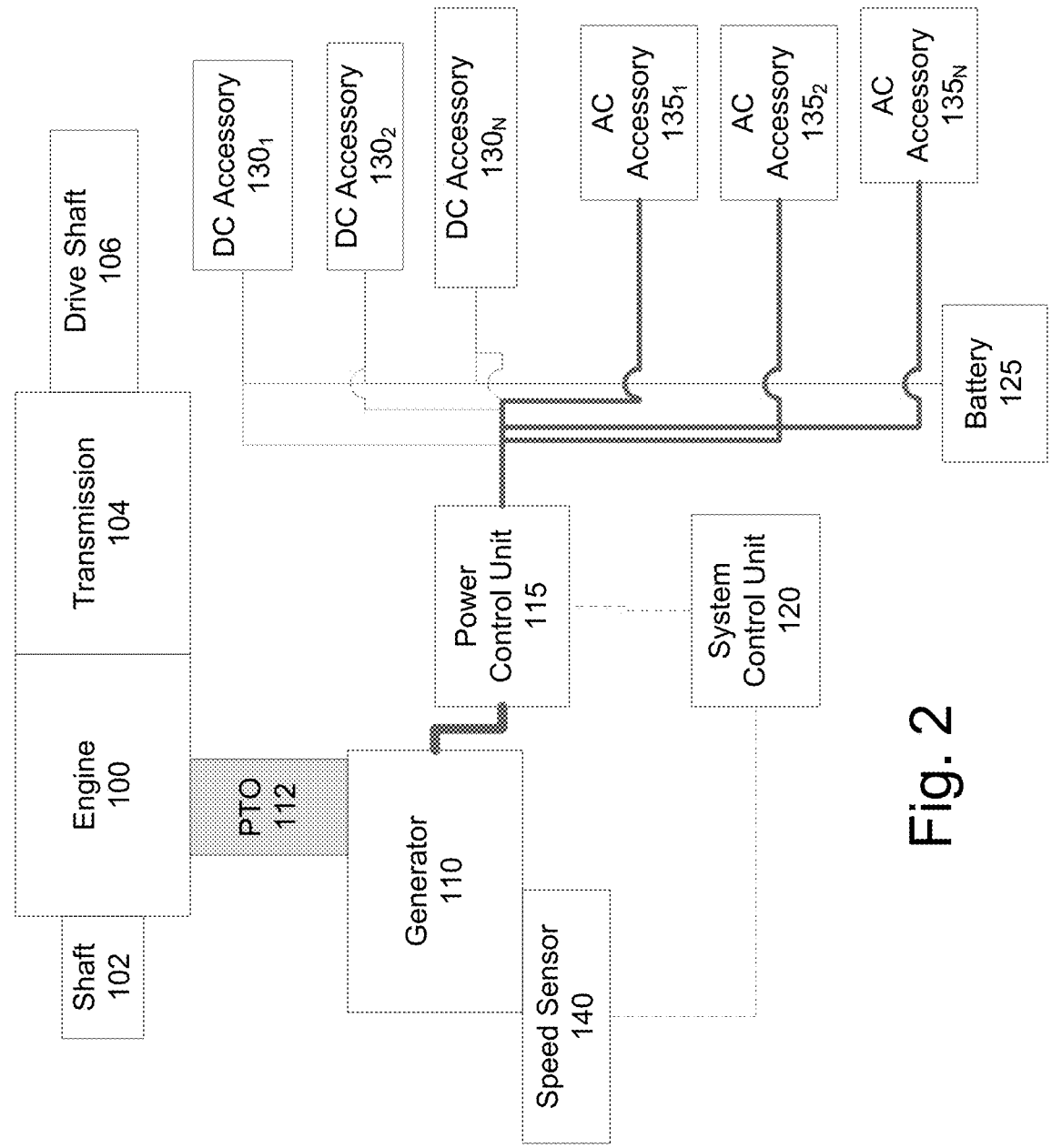
FIG. 2 illustrates a block diagram of an accessory power system coupled to an engine and a plurality of DC accessories and AC accessories in accordance with aspects of the disclosure where the generator is directly coupled to a power takeoff shaft of the engine.

The generator 110 is mechanically connected or coupled to the engine 100. As depicted in FIG. 1, the generator 110 is mechanically connected to a shaft 102 of the engine 100 via a belt/pulley system 108. While in FIG. 1, the generator 110 is connected via a belt/pulley system 108 to shaft 102, the generator 110 may be connected to the engine 100 in other ways. For example, FIG. 2 shows a different mechanical connection, e.g., the generator 110 is connected to a power take off (PTO) shaft 112. In other aspects of the disclosure, the generator 110 may be connected to a gearbox which in turn is connected to a shaft of the engine 100.

The gearbox and/or belt provide for a fixed ratio of engine speed to generator speed. In an aspect of the disclosure, the speed of the engine may be different from the speed of the generator. This difference is known in advance (by the fixed speed ratio). Therefore, when one knows the speed of the generator, one also knows the speed of the engine.

The generator 110 may be a permanent magnet generator. Other generators may be used. When coupled to the engine 100 (referred to herein as the genset), the generator provides three-phase AC electrical power. The generator 110 may provide a variable frequency AC electrical power. The generator 110 is a high voltage generator.

The generator 110 is electrically coupled to the power control unit (PCU) 115 also known as an accessory power system (APS). The coupling is shown with a thick line (verses dashed or thin). The PCU 115 provides for the power processing and conversion needed for supplying the required power to the DC accessories 130 and the AC accessories 135.

The system further comprises a system control unit (SCU) 120. The SCU 120 communicates with the PCU 115 to control the conversion and the supply of power. The dashed lines in FIG. 1 show the control signal lines. The SCU 120 also determines the torque and/or power limits for the generator 110. Additionally, the SCU 120 determines the current limits and power limits for the PCU 115.

The system further comprises a speed sensor 140. The speed sensor 140, such as a resolver, an encoder, a hall effect and self-sensing detects the speed of the generator 110. The speed sensor 140 communicates the detected speed to the SCU 120. The dashed line connecting the speed sensor 140 and the SCU 120 is a signal line.

The PCU 115 is electrically coupleable to DC accessories 130 and AC accessories 135. FIGS. 1 and 2 show the PCU 115 coupled to N number of DC accessories and N number of AC accessories. The DC accessories 130 may comprise lighting, radio, fare box, power windows, doors, fans and power steering. The DC accessories 130 are not limited to the examples provided herein.

Figure 3:
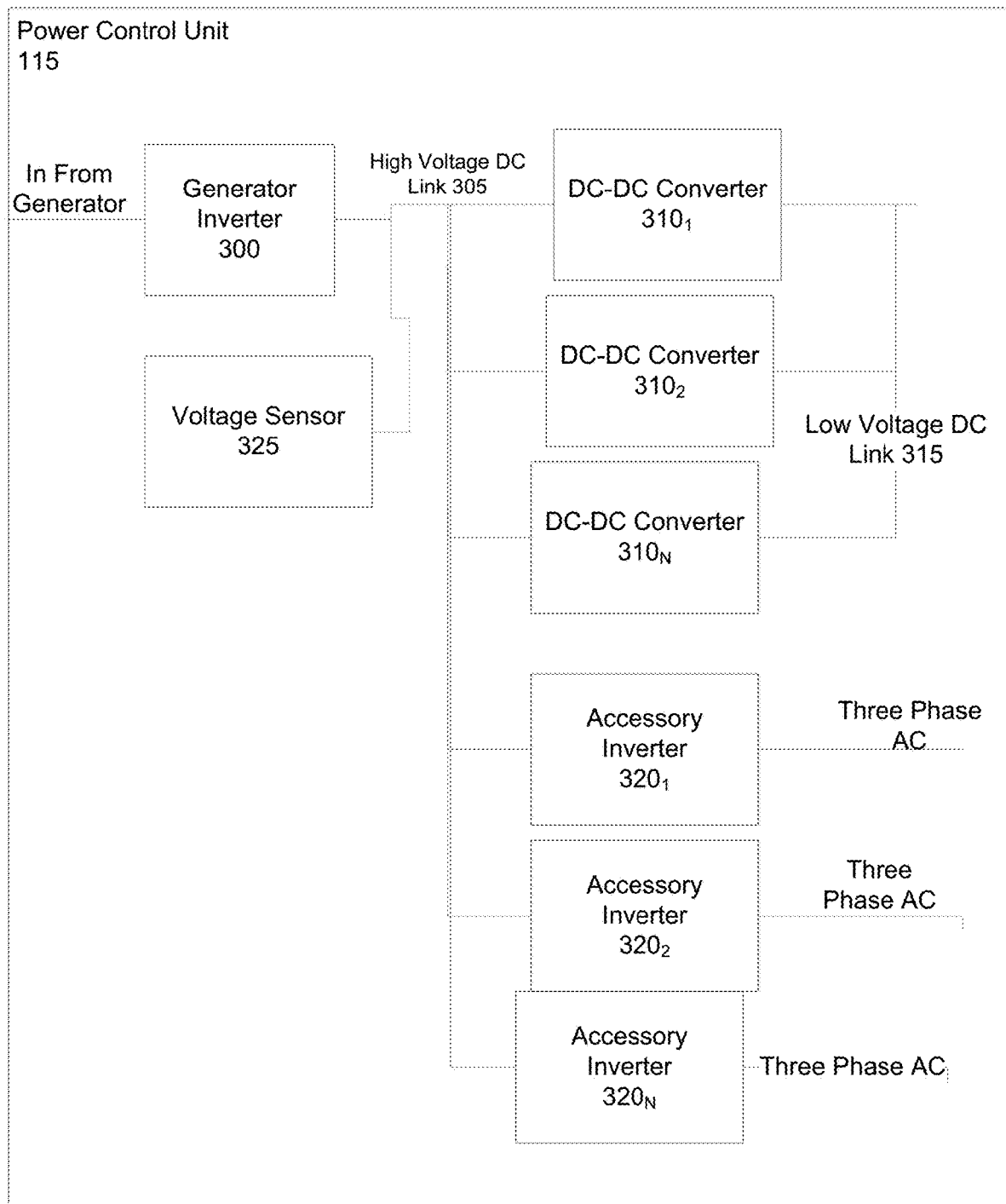
FIG. 3 illustrates a block diagram of the power control unit in accordance with aspects of the disclosure.

The PCU 115 is coupled to the DC accessories 130 via a low voltage DC link (bus) 315 (shown in FIG. 3). A battery 125, such as a lead acid battery, is also coupleable to the low voltage DC link 315. The low voltage DC link is shown in FIGS. 1 and 2 using thin lines. The battery 125 may be made from other materials such as lithium ion batteries or it could be a super capacitor. In an aspect of the disclosure, this battery 125 is used for starting, lighting and ignition (SLI).

FIG. 1 shows the battery 125 coupled to the low voltage DC link. The battery 125 is a low voltage battery.

The AC accessories 135 are typically motor driven. Thus, the PCU 115 is coupleable to the motors for the associated accessories. The AC voltage lines are shown in FIGS. 1 and 2 as solid lines (different from the high AC voltage link between the generator 110 and the PCU 115 and the low voltage DC link). For example, the AC accessories 135 may comprise air compressors, air condition compressors and power steering pumps. The AC accessories 135 are not limited to the examples provided herein. The phrase "AC accessories" used herein also refers to the sub-systems required for the accessory to function.

FIG. 3 illustrates a block diagram of the PCU 115 in accordance with aspects of the disclosure. The PCU 115 comprises a generator inverter 300, a high voltage DC link 305, one or more DC-DC converters (collectively and generally referenced herein as 310), one or more accessory inverters (collective and generally referenced herein as 320) and a voltage sensor 325.

The generator inverter 300 is electrically connected to the generator 110. The generator inverter 300 receives the three phase AC electric power from the generator 110. The generator inverter 300 shares a common high voltage DC link 305 with all accessory power inverters 320 and DC-DC converters 310.

The voltage on the high voltage DC link 305 is based on the output of the generator 110. Increasing regeneration torque of the generator 110 will result in an increase in the voltage magnitude of the high voltage DC link 305 and decreasing the regeneration torque of the generator 110 will result in a decrease in the voltage magnitude of the high voltage DC link 305. When the generator inverter 300 and generator 110 is operating at its torque and or power limit it will be unable to maintain the magnitude of the high voltage DC link 305. For example, when the generator 110 is operating at maximum regeneration torque or power and additional load is applied, the high voltage DC link voltage 305 will droop.

The DC-DC converters 310 produce an adjustable DC power source to provide power to a vehicles low voltage DC link 315. The battery 125 is connected to the low voltage DC link 315. The DC-DC converters 310 maintain a charge on the low voltage battery 125. As shown in FIG. 3, there are N number of DC-DC converters 310. In an aspect of the disclosure, number of DC-DC converters 310 is the same as the number of DC accessories 130. The DC-DC converters 310 are electrically connected to the common high voltage DC link 305.

The accessory inverters 320 produce variable frequency and voltage 3 phase power from the common DC high voltage link 305 for motor driven vehicle accessories. As shown in FIG. 3, there are N numbers of accessory inverters 320. In an aspect of the disclosure, number of accessory inverters 320 is the same as the number of AC accessories 135. In other aspects of the disclosure, the number of accessory inverters 320 is less than the number of AC accessories, where multiple AC accessories share an accessory inverter. The accessory inverters 320 are also electrically connected to the common high voltage DC link 305. The accessory motors may be connected to the accessory inverters. For example, the motor for the power steering pump may be connected to an accessory inverter (e.g., 3201).

A voltage sensor 325 is electrically coupled to the high voltage DC link 305 and configured to detect the voltage of the DC link 305. The voltage sensor 325 reports the detected voltage to the SCU 120 via a signal line (shown in FIGS. 1 and 2). The voltage sensor 325 sends the detected voltage to a processor in the SCU 120.

Figure 4:
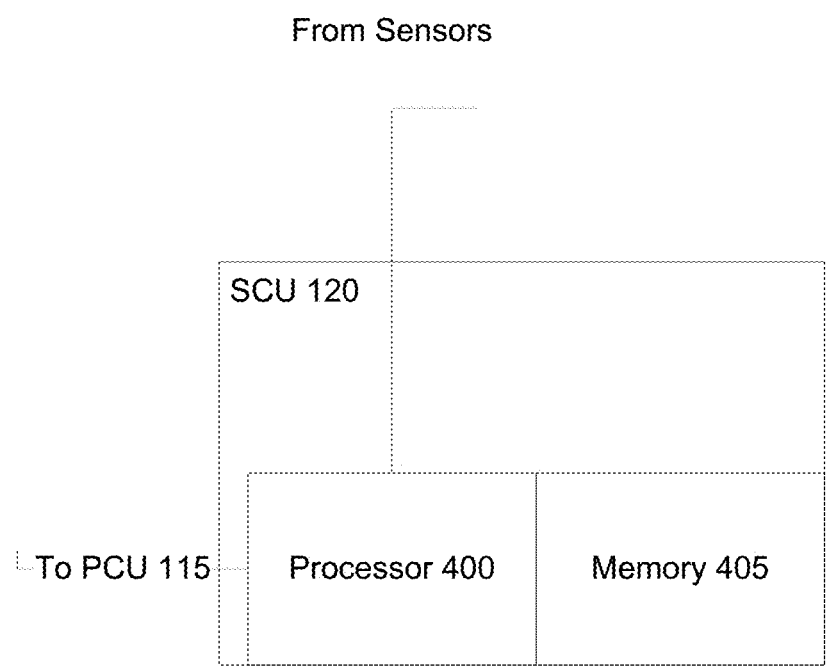
FIG. 4 illustrates a block diagram of the system control unit in accordance with aspects of the disclosure.

FIG. 4 illustrates a block diagram of the SCU 120 in accordance with aspects of the disclosure.

The SCU 120 comprises a processor 400 and memory 405. The processor 400 commands the PCU 115 via the signal line. The processor 400 implements a voltage/current regulation and torque regulation which will be described later. In another aspect of the disclosure, instead of the processor 400, the generator inverter 300 provides the regulation. For example, the generator inverter 300 may be configured to control the magnitude of the common high voltage DC link 305 by adjusting the torque produced by the generator 110. The generator inverter 300 may control regeneration torque in order to increase the voltage magnitude of the high voltage DC link 305. The generator inverter 300 may control regeneration torque in order to decrease the magnitude of the high voltage DC link 305.

Additionally, the processor 400 receives detect signals from the speed sensor 140 and the voltage sensor 325 also via signal lines.

The processor 400 may be a microcontroller or microprocessor or any other processing hardware such as a CPU, GPU, Field programmable gate array (FPGA) or Programmable logic device (PLD). The memory 405 may be separate from the processor 400 (as shown in FIG. 4 for clarity of the figure) or integrated in the same. For example, the microcontroller or microprocessor includes at least one data storage device, such as, but not limited to, RAM, ROM and persistent storage. In an aspect of the disclosure, the processor 400 may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

In accordance with aspects of the disclosure, the memory 405 may comprise setpoints used to foldback the current limit for the DC-DC converters 310, setpoints used to foldback the Volts-per hertz output from the accessory inverters 320, threshold used to foldback the torque and/or power limit of the generator 110 and setpoint therefor and time thresholds.

In accordance with aspects of the disclosure, the processor 400 regulates the power to the DC accessories 130 and the AC accessories 135 to prevent the DC-DC converters 310 and the accessory inverters 320 from overpowering the generator 110.

It is possible to know at a high bandwidth that the generator 110 is overloaded because the converters and inverters share a common high voltage DC link 305 with the generator inverter 300 and as described above, the magnitude of the DC voltage will droop when the generator 110 is limited in power or torque. When there is a voltage droop of the common high voltage DC link 305 either current is limited for one or more of the DC-DC converters 310 and/or the Volts-per-hertz is limited for one or more accessory inverters 320.

In an aspect of the disclosure, the foldback may be prioritized based on the accessories (AC and DC) and their associated DC-DC converters and accessory inverters. For example, a priority may be assigned to different accessories when folding back the power sources.

Priority is assigned to different accessories 130 and 135 by selecting different foldback setpoints for their associated DC-DC converter or accessory inverter. As the high voltage DC link 305 droops, the DC-DC converter 310 or accessory inverter 320 with the highest setpoint will foldback its load first. As the link droops below each DC-DC converter or accessory inverter's setpoint, power will be removed from the generator inverter 300 which will act to restore the balance of power between the generator inverter 300 and the DC-DC converters 310 and accessory inverters 320.

In an aspect of the disclosure, a goal is to have uninterrupted power at the system level and another goal is to foldback non critical loads before critical loads (for example it may be desirable to lose power to the air conditioner before the power steering).

Because of the battery 125 being coupled to the low voltage DC link 315, DC-DC converters 310 may be given lowest priority and are set to foldback first (highest voltage foldback setpoint also referred to as foldback setpoints, voltage setpoints and DC voltage setpoints). In an aspect of the disclosure, all DC-DC converters 310 may have an equal foldback setpoints in order to maintain sharing of the load. The system maintains uninterrupted power because the battery 125 transiently supplies power to the DC accessories 130 attached to the low voltage DC link 315 (unless the battery has no power).

In an aspect of the disclosure, the AC accessories 135 may be given high priority by setting the voltage foldback setpoint lower than the DC-DC converters 130. This is because a foldback applied to the V/Hz output of the AC accessories 135 and will directly reduce the delivered power which may be noticeable to a user.

When more than one accessory inverter 320 is provided, each AC accessory and associated accessory inverter, may be further prioritized by assigning a different foldback setpoint to each AC accessory. For example, power steering may be set at a lower voltage setpoint than air conditioning in order to give it priority.

Figure 5:
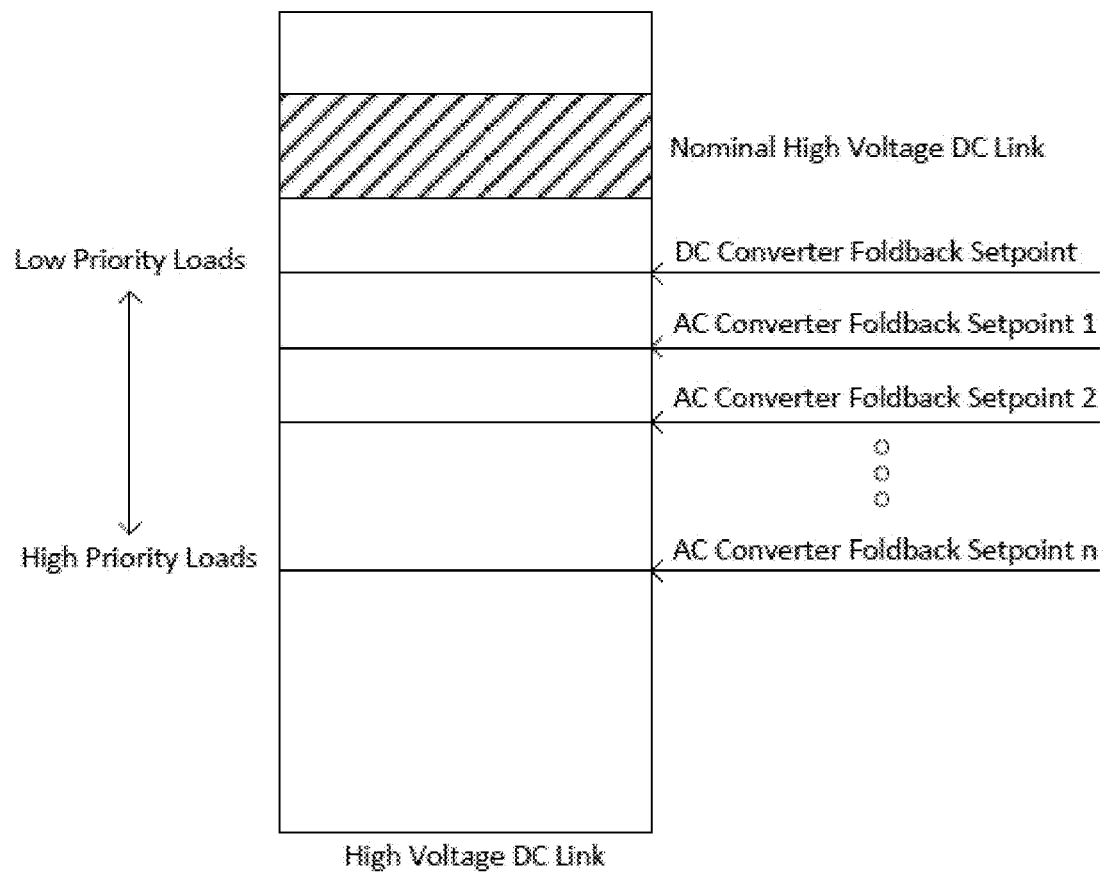
FIG. 5 illustrates an example priority based setpoints for the DC accessory and AC accessories in accordance with aspects of the disclosure.

FIG. 5 illustrates an example of priority based setpoints for a DC accessory and a plurality of AC accessories in accordance with aspects of the disclosure. As shown in FIG. 5, low priority accessories (loads) are given a high setpoint, whereas high priority loads are given a low setpoint. The arrow on the left of the figure shows low verse high priority loads. The dash box on the top reflects a value of the nominal high voltage DC link. For example, the value may be 600V. The setpoints are a voltage value less than the nominal voltage for the high voltage DC link.

Each line represents a voltage value for the setpoint. As shown, the DC-DC converter 310 has the highest setpoint (foldback setpoint), e.g., closest to the nominal high voltage DC link value. The accessory inverters 320 for the AC accessories have lower setpoints (Foldback setpoint 1-$n$). As shown in FIG. 5, each AC accessory (and associated accessory inverter) has a different setpoint. High and low is determined with respect to the nominal voltage for the high voltage DC link 305.

In an aspect of the disclosure, the processor 400 determines foldback using proportional integral control (PI). An example of the PI control executed by the processor is shown in FIG. 6.

Figure 6:
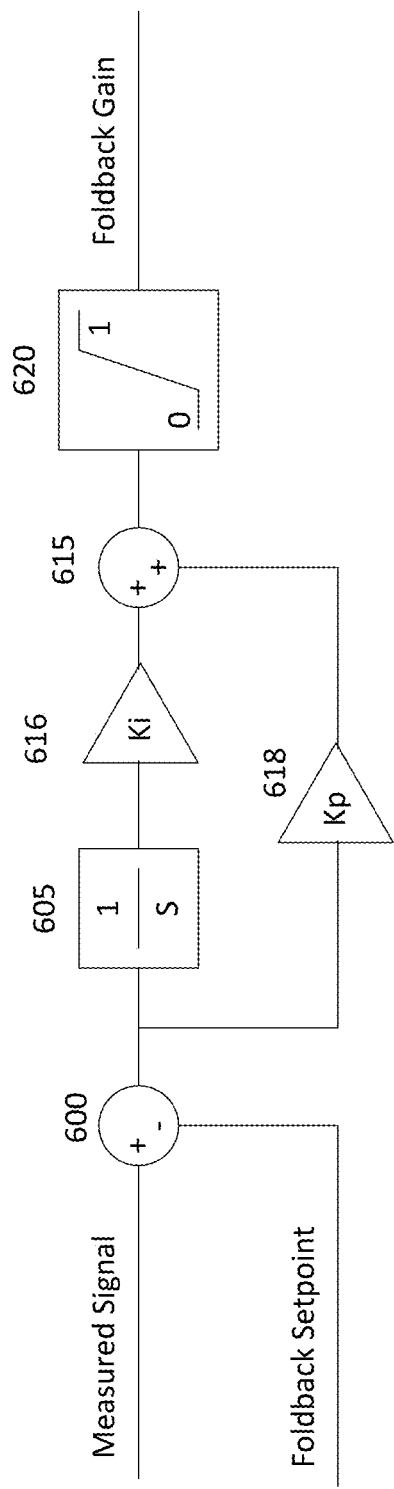
FIG. 6 illustrates a diagram of a proportion integrated control executed by a processor in accordance with aspects of the disclosure.

In FIG. 6, the measured signal is the voltage on the high voltage DC link 305 detected by the voltage sensor 325. The foldback setpoint is the value for a specific DC-DC converter or accessory inverter. The PI is repeated for each accessory, as needed. Using the PI, the processor 400 calculates a foldback gain which can be applied to the output current limit of the DC-DC converters 310 or equivalently to the Volts-per hertz of output AC voltages of the accessory inverters 320. The foldback gain is limited to between 0 and 1 as shown in 620.

The PI determines the difference between the measured voltage (detected) and the foldback setpoint 600 (subtracter). When the measured voltage (detected) is greater than a foldback setpoint, the processor 400 determines a value of 1 for the foldback gain and no foldback to the current limit for a DC-DC converter is applied or a Volts-per hertz of the accessory inverter.

When the measured voltage (detected) is less than the foldback setpoint, the processor 400 determines a steady-state output of 0 for the foldback gain and thus a full foldback would apply, e.g., either to the current limit for a DC-DC converter 310 or to the Volts-per hertz of an accessory inverter 320. The time to a steady-state value for the foldback gain is determined from control gains, Ki 616 and Kp 618. The rate may be controlled by adjusting the control gains. Kp 618 is a fast foldback, whereas Ki 616 is an incremental foldback. By having a large Kp 618, the foldback is quicker, e.g., reaches steady-state (full foldback quicker).

Figure 7:
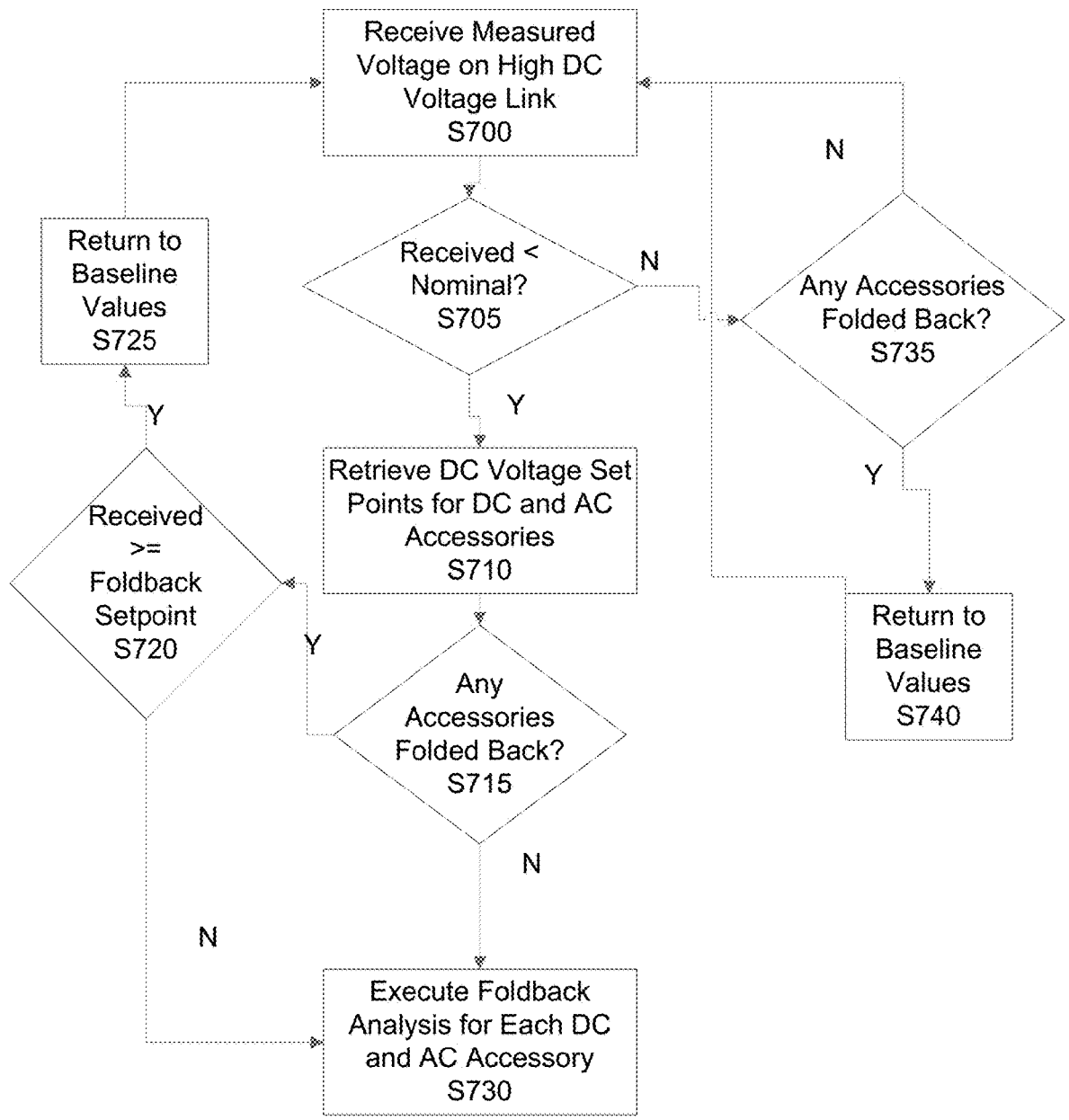
FIG. 7 illustrates a block diagram for accessory foldback due to voltage droop in accordance with aspects of the disclosure.

FIG. 7 illustrates a method for regulating power to accessories in accordance with aspects of the disclosure. In FIG. 7, the power to the accessories is regulated to reduce or avoid a voltage droop on the high voltage DC link 305.

At S700, the processor 400 receives a measured voltage on the high voltage DC link. This voltage is detected by the voltage sensor 325 in the PCU 115 and transmitted over a signal line. The measured voltage is temporarily stored in the memory 405.

At S705, the processor 400 compares the measured voltage with the nominal voltage of the high voltage DC link. In an aspect of the disclosure, the nominal voltage is preset and stored in memory 405. The processor 400 retrieves the nominal voltage from memory 405.

If the measured voltage is less than the nominal voltage ("Y" at S705), the processor 400 retrieves the setpoints for the DC accessories and the AC accessories from memory 405, at S710. A measured voltage being less than the nominal voltage indicates voltage droop and a potential overload on the generator 110.

At 715, the processor 400 determines whether any accessory, e.g., DC accessory 130 or AC accessory 135 had been previously folded back, e.g., current limit applied to its DC-DC converter 310 or accessory inverter 320. This determination is made to see if the current limit for the DC or AC accessory still needs to be applied or can be removed.

If at S715 it is determined that no accessory had been previously folded back ("N at S715), the processor 400 executes a foldback analysis for each DC and AC accessory (as needed) at S730 using the retrieved setpoints. The processor 400 executes the PI control as depicted in FIG. 6. For example, for a DC accessory, the processor 400 determines a difference between the measured voltage and the setpoint (voltage) 600. When the measured voltage is greater than the DC setpoint (voltage), the power to the associated DC accessory remains the same, e.g., no foldback. On the other hand, when the measure voltage is less, e.g., negative difference, foldback occurs. In an aspect of the disclosure, the processor 400 also retrieve Kp 618 and Ki 616 from memory. The processor 400 integrates the difference between the measured voltage and the setpoint voltage over time (shown as 1/S 605 in FIG. 6) and multiples the integrated difference by Ki 616 to get a first value. Additionally, the processor 400 multiples the difference between the measured voltage and the setpoint voltage by Kp 618 to get a second value. The foldback gain is determined by adding, using an adder 615, the first and second values.

The processor 400 controls the corresponding DC-DC converter (e.g., 3101) using the foldback gain. For example, when the steady-state foldback gain is zero, the current limit is zero and no power is supplied to the DC accessory (e.g., 1301) from the DC-DC converter (e.g., 3101). Between the steady-state being zero and no foldback, the power supplied to the DC accessory (e.g., 1301) is reduced to the current limit from the DC-DC converter (e.g., 3101).

Figure 9:
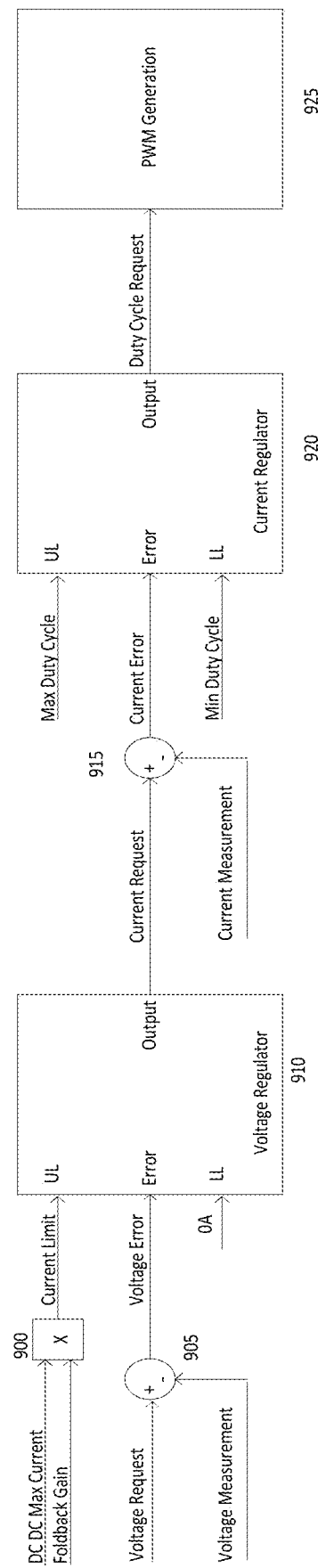
FIG. 9 depicts a block diagram of a control path for the DC-DC converter in accordance with aspects of the disclosure.

FIG. 9 depicts a block diagram of a control path for the DC-DC converter in accordance with aspects of the disclosure. The control depicted may be executed by processor 400. As described above, the foldback gain is used to set the current limit. The DC-DC converter has a preset DC-DC Max current. The processor 400 adjusts the preset DC-DC Max current by multiplying using a multiplier 900 the foldback gain with the preset DC-DC Max current. This is the current limit input to the UL of the voltage regulator 910. The system includes voltage and current sensors for detecting the voltage and current supplied by a DC-DC converter. The processor 400 determines a difference, using subtractor 905, between the requested voltage and voltage measurement from the voltage sensor. The difference is input as the voltage error into the voltage regulator 910 (error). Zero Amps (0 A) (e.g., lower limit) is also input to the voltage regulator 910.

The voltage regulator 910 (processor) outputs a current request to the current regulator 920. The processor 400 determines the difference between the current request (as determined by the voltage regulator 910) and the current measurement as detected by the current sensor (for the current output by the DC-DC converter) using subtractor 915. The difference is input to the current regulator 920 as current error (error). The current regulator 920 also receives the Max and Min Duty Cycle and outputs a duty cycle request to the PWM generation 925.

As described above, the processor 400 executes the multiplier 900, subtractors 905/915, the voltage regulator 910 and the current regulator 920. In other aspects of the disclosure, the control is in the DC-DC converter itself.

The foldback analysis is repeated for each DC accessory 310. In an aspect of the disclosure, each DC accessory has the same setpoint, thus, if one DC accessory is folded back using a current limit, each DC accessory will either reduce zero power (in steady-state) or reduced power. The reduction in power supplied to the DC accessory is temporary and the power will return to the baseline value when the measured voltage returns to above the setpoint. When power is reduced to the DC accessory (e.g., 1301), the battery 125 supplies the power to the same. The baseline value is a power drawn before a foldback event as dictated by the loads and the state of charge of the battery 125.

In an aspect of the disclosure, prior to analyzing the AC accessories 135 for foldback, the processor 400 causes the voltage sensor 325 to detect the voltage on the high voltage DC link 305 again to see if the voltage increased back to the nominal value to avoid impacting the AC accessories.

If still below, the processor 400 performs foldback analysis for the AC accessories 135. The processor 400 starts with the AC accessory having the highest voltage setpoint (e.g., 135₁). The foldback analysis for the AC accessory (e.g., 135₁) is the same as for the DC accessory (except for a different setpoint). For example, for an AC accessory (e.g., 135₁), the processor 400 determines a difference between the measured voltage and the foldback setpoint. When the measured voltage is greater than the foldback setpoint, the power to the associated AC accessory remains the same, e.g., no foldback. On the other hand, when the measure voltage is less, e.g., negative difference, foldback occurs. The foldback gain is determined in a similar manner as described above and will not be described again.

The processor 400 controls the corresponding accessory inverter (e.g., 3201) using the foldback gain to adjust the Volts-per hertz output by the inverter.

For example, when the steady-state foldback gain is zero, the volts-per hertz output is zero and no power is supplied to the AC accessory (e.g., 135₁) from the accessory inverter (e.g., 3201). Between the steady-state being zero and no foldback, the power supplied to the AC accessory (e.g., 135₁) is reduced by a Volts-per hertz proportional to the foldback gain.

Figure 10:
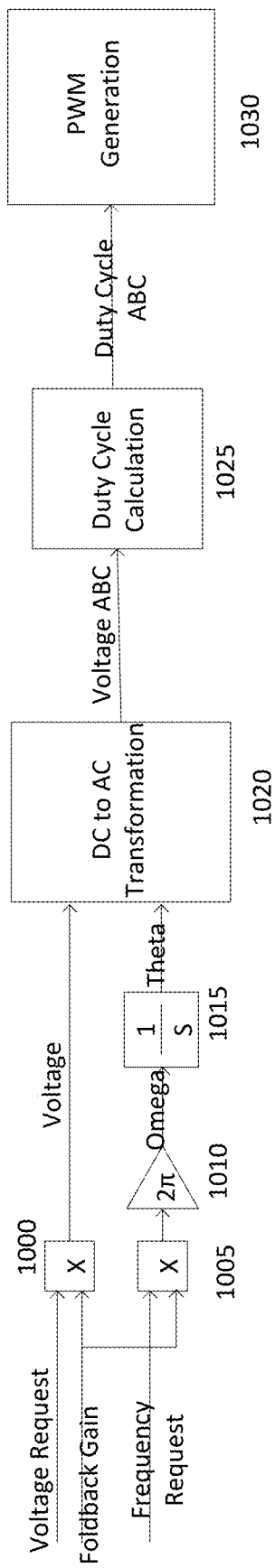
FIG. 10 illustrates a control path for the inverter in accordance with aspects of the disclosure.

FIG. 10 illustrates a control path for the inverter in accordance with aspects of the disclosure. As with the control path for the DC-DC converter, the control may be executed by the processor 400. In other aspects of the disclosure, the control may be implemented in the inverter itself.

The foldback is applied to both the requested voltage and frequency. The processor 400, using multipliers 1000/1005 multiples the foldback gain with the voltage request and the frequency request. The resultant voltage is input to the DC to AC transformation 1020 (mathematical transformation). The resultant frequency is multiplied by $2\pi$ to obtain Omega. The Omega is integrated (shown in FIG. 10 as 1/S, integrator 1015) outputting Theta. The theta is input to the DC to AC transformation 1020, which is executed by the processor 400. The DC to AC transformation 1020 outputs an AC voltage signal (identified as Voltage ABC in FIG. 10). The processor 400 executes a duty cycle calculation 1025. This outputs a duty cycle (identified as Duty Cycle ABC in FIG. 10) to the PWM generation 1030.

As shown in FIG. 10, the processor 400 may execute the multipliers 1000/1005, the integration 1015, the DC to AC transformation 1020, duty cycle calculation 1025 and PWM generation 1030.

In an aspect of the disclosure, prior to analyzing other AC accessories for foldback, the processor 400 causes the voltage sensor 325 to detect the voltage on the high voltage DC link 305 again to see if the voltage increased back to the nominal value to avoid impacting other AC accessories.

If still below, the processor 400 performs foldback analysis for another AC accessory (e.g., 135₂). In an aspect of the disclosure, the foldback analysis for AC accessories 135 and voltage sensing on the high voltage DC link 305 may be alternative performs, sensing the voltage in between the foldback analysis.

In other aspects of the disclosure, the processor 400 performs the foldback analysis for each DC accessory 130 and AC accessory 135 prior to sensing the voltage on the high voltage DC link 305 again.

If, on the other hand, at S715, a DC or AC accessory (130 or 135) had previously been folded back ("Y" at S715), the processor 400 determines whether the current limit or Volts-per hertz may return to a baseline value at S720.

At S720, the processor 400 determines whether the measured voltage on the high voltage DC link 305 is greater than or equal to the foldback setpoint for an accessory. This determination is made for each accessory that was folded back. If the processor 400 determines that the measured voltage is greater than or equal to the foldback setpoint for an accessory, the current limit or Volts-per hertz returns to a baseline value at S725. The processor 400 issues an instruction to the DC-DC converter 310 or the accessory inverter 320 with the baseline value. The PI controller (processor) will receive a positive error, when this positive value is multiple by Kp 618 and added to the integral path (Ki), the value of the foldback gain will transition from 0 back to 1.

If the processor 400 determines that the measured voltage is still less than the foldback setpoint, the process moves to S730 and the accessory remains in a foldback state.

Referring back to S705, if at S705 the processor 400 determines that the measured voltage equals the nominal voltage ("N" at S705), the processor 400 determines whether any accessory had been previously folded back to return the current limit or Volts-per hertz to the baseline value.

If the processor 400 determines that there are accessories that had been previously folded back at S735 ("Y" at S735), the current limit or Volts-per hertz returns to a baseline value at S740 and the control described in FIG. 9 or 10 is executed with no foldback gain.

Afterwards, the process returns to S700. Similarly, if there are no accessories in a folded back state ("N" at S735), the process returns to S700.

Figure 8:
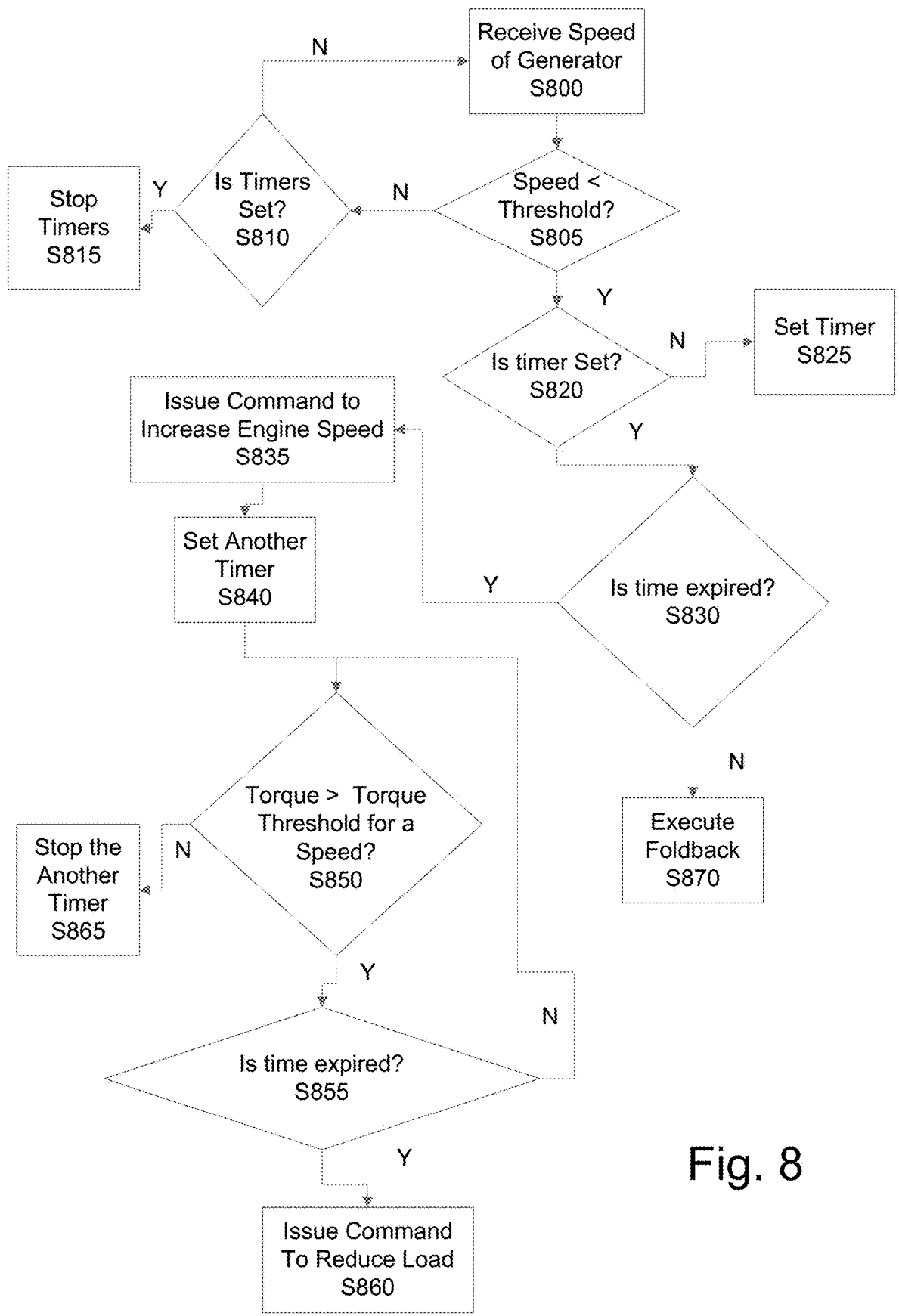
FIG. 8 illustrates a block diagram for torque or power limit foldback due to generator/engine speed in accordance with aspects of the disclosure.

FIG. 8 illustrates a method for regulation in accordance with other aspects of the disclosure to reduce a likelihood or prevent the engine 100 from exceeding its torque or power limit. At S800, the processor 400 receives the speed of the generator 110 from a speed sensor 140. The speed is received over a signal line. Since the generator 110 is mechanically coupled to the engine 100, the speed of the generator has a fixed ratio to the engine speed, which is known in advance. Therefore, either speed (engine or generator) may be used in the following. For example, in an aspect of the disclosure, prior to S805, the processor 400 may convert the sensed generator speed into an engine speed using the fixed ratio, where the threshold is an engine speed.

At S805, the processor 400 compares the speed with a threshold for speed stored in memory 405. The processor retrieves the threshold from memory 405. In an aspect of the disclosure, the threshold may be an idle speed of the engine (or any equivalent generator speed). In another aspect of the disclosure, the threshold is a value less than idle speed used to indicate a stall condition. When the speed is less than the threshold, the engine may be overloaded. In an aspect of the disclosure, the processor 400 may either reduce the torque or power limit of the generator, issue a speed command to an engine controller to increase the speed of the engine or issue a command to another controller to deactivate an accessory depending on certain other conditions. One of these conditions is the time that the overload condition is experienced. In aspects of the disclosure, two timers and two time specific values (or thresholds) are used. One timer is used to determine whether the speed of the engine should be increased and another timer is used to determine whether load should be removed.

If the speed is equal to or greater than the threshold ("N" at S805), the processor 400 determines whether both timers had been previously set (due to a previous overloading condition) at S810. If the timers are not set, the process returns to S800. If the timers are set ("Y" at S810), the processor 400 stops the timers and reset them to zero at S815.

If the speed is less than the threshold ("Y" at S805), the processor 400 determines whether a timer, e.g., first timer, is set at S820. If the timer is not set ("N" at S820), the processor 400 sets the timer to a specific value at S825. This timer is used to determine whether to increase the speed of the engine. For example, the timer may be set to 5 seconds or 10 seconds. Instead of setting the timer to a specific value, the processor may start the timer and determine whether the time reaches a threshold. The same alternatives apply above as well.

If the timer is set and counting down (or started and counting up) ("Y" at S820), the processor 400 determines whether the time has expired (if counting down) or has reached a threshold (if counting up) at S830.

If the time has not expired or has not reached the threshold ("N" at S830), the processor 400 executes a foldback of the torque or power limit of the generator 110 (S870 is also executed after S825). In an aspect of the disclosure, the processor 400 executes a PI control to determine a foldback gain similar as described above. However, in this case, the measured value is the speed (of either the engine or generator) and the setpoint is also a speed. In an aspect of the disclosure, the setpoint is a speed less than the idle speed of the engine (or a speed that correlated by the fixed ratio to the same). In this PI, ki and kp are different values than above. Similarly, kp causes a quicker decrease in the torque or power limit of the engine whereas ki incrementally decrease the torque or power limit over time. As with above, the minimum torque or power limit is zero, e.g., full foldback. The upper limit is a maximum capability for the power electronics, e.g., generator and inverters.

The setpoint speed is subtracted by the measured speed. The processor 400 integrates the difference over time and multiples the same by Ki to get the first value and multiples the difference by kp to obtain the second value. The foldback gain for the generator torque and power limit, e.g., regenerating torque and power limit, is determined by adding the first value and the second value.

Any subsequent torque or power generated by the generator 110 is based on the torque or power limit. The foldback gain is multiplied by the torque or power limit of the generator 110 to produce a present value of the torque or power limit that is used to provide the upper limit to the torque or power produce by the voltage regulator. When the desired torque or power exceeds the torque or power limit as determined using the foldback gain, the processor 400 regulates the torque or power to equal the torque or power limit. Otherwise, when the desired torque or power is less than or equal the torque or power limit, the desired torque or power is used.

The foldback will remove torque and/or power from the engine 100 and acts to prevent the engine 100 from stalling. However, the foldback will likely cause a voltage droop in the high voltage DC link 305 which will trigger the foldback of the accessories which was described in FIG. 7 and thus will not be described again in detail.

If the time has expired or has reached the threshold ("Y" at S830), the processor 400 issues a command to an engine controller to increase the speed of the engine, e.g., to above the idle speed at S835. The command is issued via a communication line (bus), which is not shown in FIG. 1 or 2. The value of the timer may be application dependent. In aspects of the disclosure, the timer may be based on a maximum amount of time a transient load step event could occur. The timer would be set to be greater than this time. Additionally, the timer may be user or operator (owner of vehicles), e.g., amount of time the operator is willing to allow accessories to run at a reduced performance.

Afterwards, the processor 400 sets another timer at S840. This timer is used to determine whether to remove a load from the generator 110, e.g., AC accessory 135. For example, the timer may be 10 seconds or 20 seconds. Instead of setting the timer to a specific value, the processor 400 may start the timer and determine whether the time reaches another threshold. The processor 400 determined whether a current torque is greater than a torque threshold for a given speed. The torque threshold is different for different speeds. In an aspect of the disclosure, the memory 405 includes a table of torque thresholds indexed by speed. The processor receives the current speed via a signal line. The processor 400 using the current speed, retrieves the corresponding torque threshold from memory 405. At S850, the processor 400 compares the current torque with the torque threshold for the current speed. When the torque is greater than the torque threshold is equal ("Y" at S850), the engine 100 is overloaded. The processor 400 determines the length of the overload. At S855, the processor 400 determines whether the time has expired (if counting down) or has reached the another threshold (if counting up).

If the time on the another timer has not expired or has not reached the another threshold, the process returns to S850 otherwise, the process moves to S860. At S860, the processor 400 issues a command to a vehicle controller (not shown) to reduce the load. The command is transmitted via a communication line (bus) also not shown. For example, in an aspect of the disclosure, the vehicle may disable a low priority load, such as an air conditioning system.

If at S850, the processor 400 determines that the current torque is less than or equal to the torque threshold for the current speed ("N" at S850), the processor 400 stops the another timer at S865. The process then returns to S800.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. An accessory power system comprising:
   a first inverter coupled to a generator, where the generator is mechanically coupleable to an engine, the first inverter, when the generator is coupled to the engine, is configured to receive AC power from the generator and provide DC power for a first DC link;
   a DC-DC converter coupled to the first DC link and configured to receive the DC power from the first inverter and provide DC power to a second DC link to power a DC accessory, wherein the second DC link is couplable to a battery;
   a second inverter coupled to the first DC link and configured to receive the DC power from the first inverter and provide AC power to an AC accessory; and
   a processor configured to:
      control the generator output and cause power to be supplied from the generator to the DC accessory and the AC accessory;
      receive a detected DC voltage on the first DC link;
      compare the detected DC voltage on the first DC link with a DC voltage setpoint for the DC accessory, when the detected DC voltage is less than the DC voltage setpoint, the processor is configured to decrease an output current limit for the DC-DC converter from a baseline value, wherein when the second DC link is coupled to the battery, power to the DC accessory is provided by the battery.

2. The accessory power system of claim 1, further comprising a plurality of DC-DC converters include the DC-DC converter, each of the plurality of DC-DC converters respectively coupled to the first DC link and configured to receive the DC power from the first inverter and provide DC power to the second DC link to respectively power a DC accessory, each DC accessory has the DC voltage setpoint, and wherein when the detected DC voltage on the first DC link is less than the DC voltage setpoint, the processor is configured to decrease the output current limit for each of the DC-DC converters, and wherein the power to each of the DC accessories is provided by the battery.

3. The accessory power system of claim 1, wherein when the detected DC voltage on the first DC link moves above the DC voltage setpoint after being less than the DC voltage setpoint, the processor is configured to increase the output current limit for the DC-DC power to the baseline value.

4. The accessory power system of claim 1, wherein the AC accessory has another DC voltage setpoint, the another DC voltage setpoint is less than the DC voltage setpoint, and wherein the processor is further configured to compare the detected DC voltage on the first DC link with the another DC voltage setpoint for the AC accessory, when the detected DC voltage is less than the another DC voltage setpoint, the processor is configured to decrease a Volts-per hertz output of the second inverter from a baseline value.

5. The accessory power system of claim 4, wherein when the detected DC voltage on the DC link moves above the another DC voltage setpoint after being less than the another DC voltage setpoint, the processor is configured to increase the Volts-per hertz output for the second inverter to the baseline value.

6. The accessory power system of claim 1, further comprising a plurality of second inverters including the second inverter, each of the plurality of second inverters respectively coupled to the first DC link and configured to receive the DC power from the first inverter and provide AC power to a respective AC accessory, each AC accessory has a different another DC voltage setpoint, and wherein when the detected DC voltage is less than a different another DC voltage setpoint for one or more of the AC accessories, the processor is configured to decrease a Volts-per hertz output of one or more second inverters corresponding to the one or more AC accessories having the different another DC voltage setpoint being greater than the detected DC voltage.

7. The accessory power system of claim 1, where when the detected DC voltage on the first DC link moves above a different another DC voltage setpoint for the one or more of the AC accessories after being less that the different another DC voltage setpoint, the processor is configured to increase the Volts-per hertz output for the corresponding second inverter to the baseline value.

8. The accessory power system of claim 1, wherein the second inverter is coupled to a plurality of AC accessories, each of the plurality of AC accessories has a same another DC voltage setpoint.

9. The accessory power system of claim 6, wherein the processor is further configured to:
receive a detected speed of the generator or engine;
compare the detected speed with a threshold,
when the detected speed is less than the threshold, the processor is configured to lower a torque or power limit for the generator; and
control the generator output based on the lowered torque or power limit.

10. The accessory power system of claim 9, wherein the processor is further configured to when the detected speed moves to a speed higher than the threshold after being less than the threshold, raise the torque or power limit for the generator to a baseline value and control the generator output based on the baseline value.

11. The accessory power system of claim 9, wherein the processor is further configured to:
determine a length of time where the detected speed is less than the threshold, and when the determined length of time is greater than a time threshold, the processor is configured to issue a torque or speed command to an engine controller to increase the speed of the engine to a specified speed.

12. The accessory power system of claim 9, wherein the threshold is a set value less than idle speed.

13. The accessory power system of claim 11, wherein the processor is further configured to
determine whether a torque is greater than a torque threshold for a current speed, and determine a length of time where the torque is greater than the torque threshold, when the length of time exceeds another time threshold, the processor is configured to issue an instruction to a vehicle to remove an accessory from a load on the accessory power system.

14. The accessory power system of claim 6, wherein the DC voltage setpoint for each DC accessory and the another DC voltage setpoint for each AC accessory is set based on a priority of each respective DC accessory and each respective AC accessory.

15. An accessory power system comprising:
a first inverter coupled to a generator, where the generator is mechanically coupleable to an engine, the first inverter, when the generator is coupled to the engine, is configured to receive AC power from the generator and provide DC power for a first DC link;
a DC-DC converter coupled to the first DC link and configured to receive the DC power from the first inverter and provide DC power to a second DC link to power a DC accessory, wherein the second DC link is coupleable to battery;
a second inverter coupled to the first DC link and configured to receive the DC power from the first inverter and provide AC power to an AC accessory; and
a processor configured to:
receive a detected DC voltage on the first DC link;
compare the detected DC voltage on the first DC link with a DC voltage setpoint for the DC accessory, when the detected DC voltage is less than the DC voltage setpoint, the processor is configured to decrease an output current limit for the DC-DC converter from a baseline value;
control the generator output and cause power to be supplied from the generator to the DC accessory and the AC accessory;
receive a detected speed of the generator;
compare the detected speed with a threshold,
when the detected speed is less than the threshold, the processor is configured to lower a torque or power limit for the generator; and
control the generator output based on the lowered torque or power limit.

16. The accessory power system of claim 15, wherein the processor is further configured to when the detected speed moves to a speed higher than the threshold after being less than the threshold, raise the torque or power limit for the generator to a baseline value and control the generator output based on the baseline value.

17. The accessory power system of claim 15, wherein the processor is further configured to:
determine a length of time where the detected speed is less than the threshold, and when the determined length of time is greater than a time threshold, the processor is configured to issue a torque or speed command to an engine controller to increase the speed of the engine to a specified speed.

* * * * *